June 5, 1956  E. L. WOOD  2,749,184
WHEEL TRIM AND FASTENING MEANS
Filed March 23, 1953  3 Sheets-Sheet 2
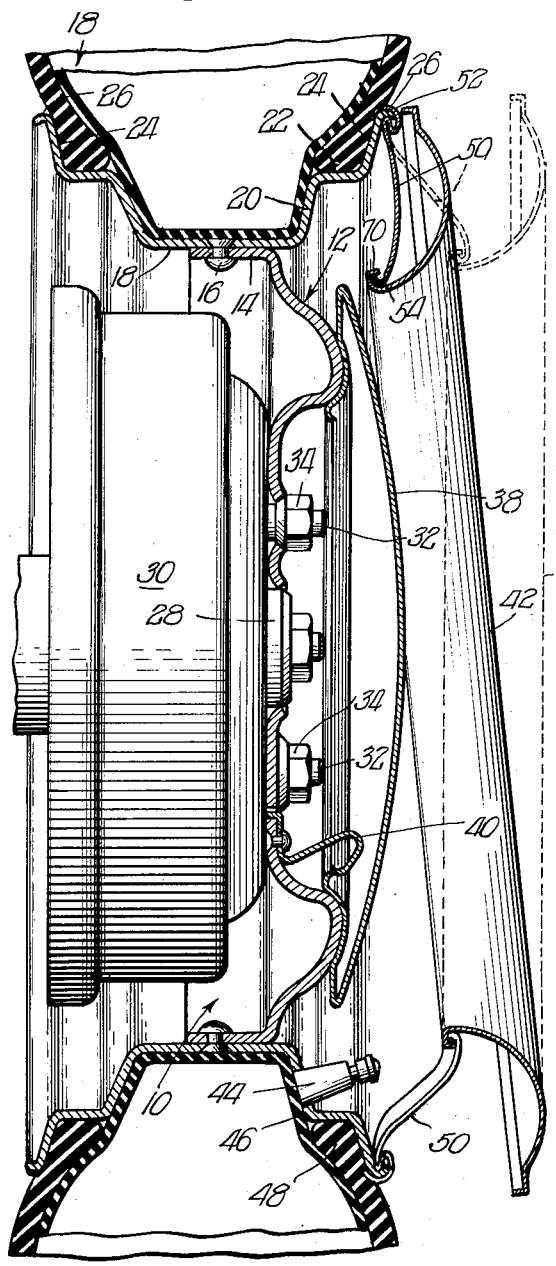
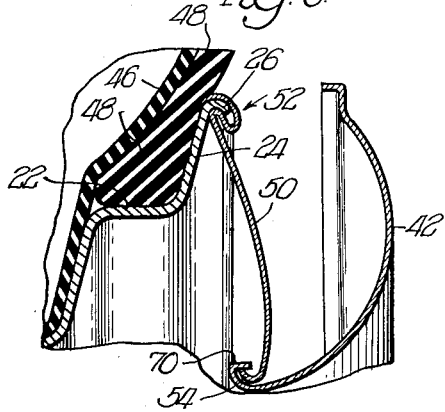
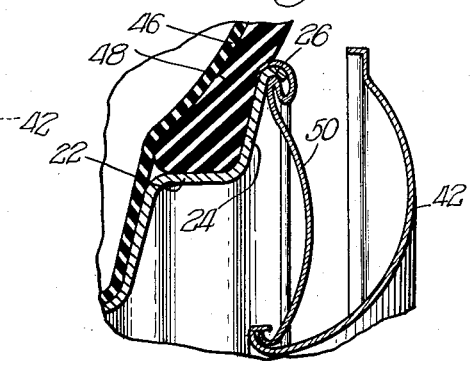
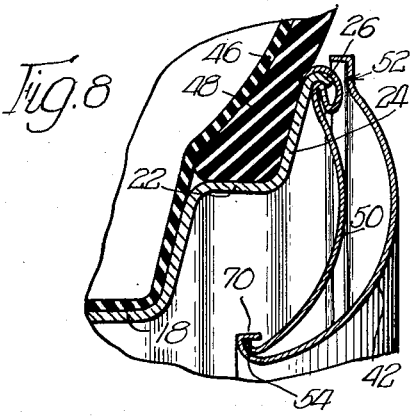
INVENTOR.
Edward L. Wood,
BY
Wilkinson Huxley Byron & Hume
Attys.

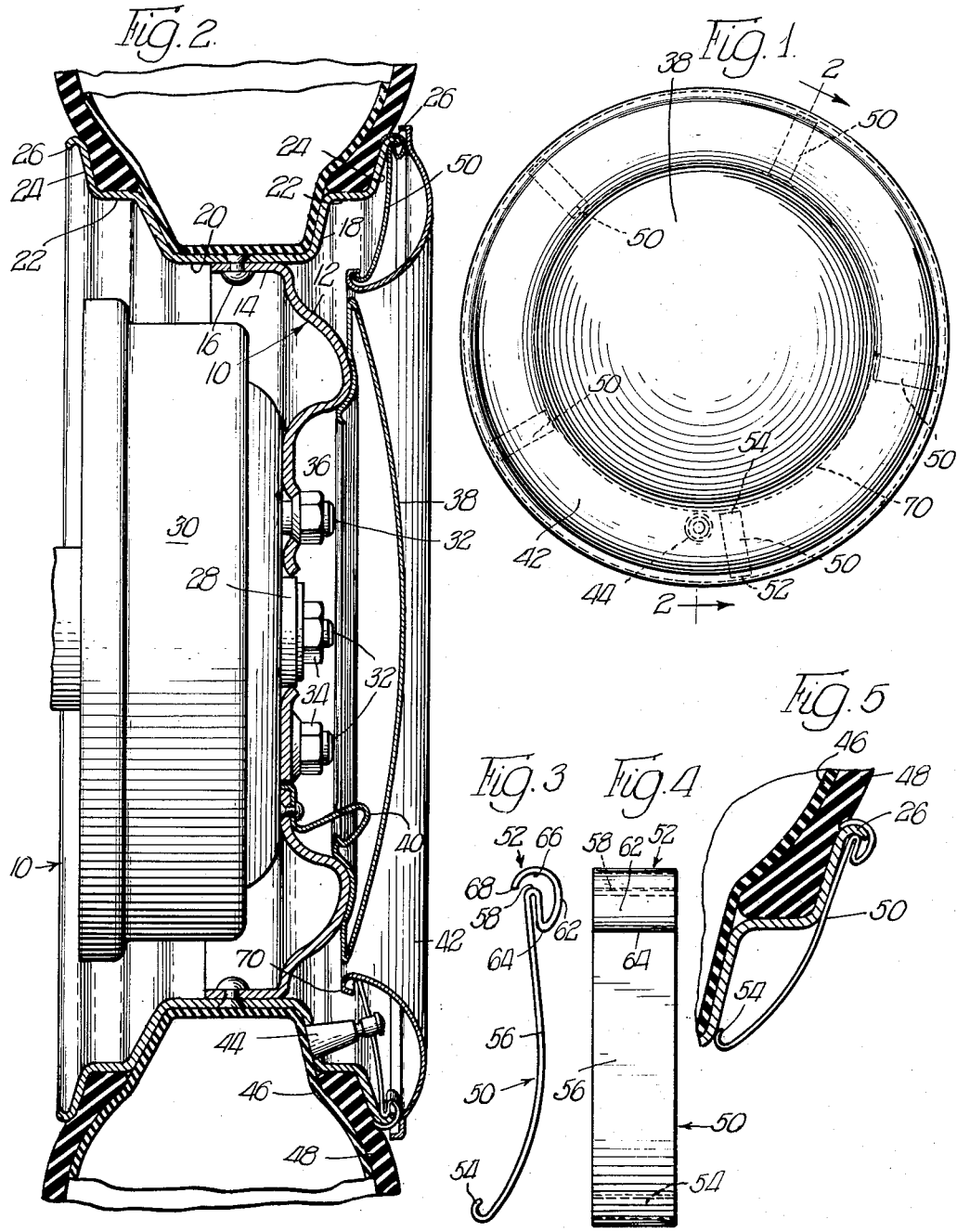

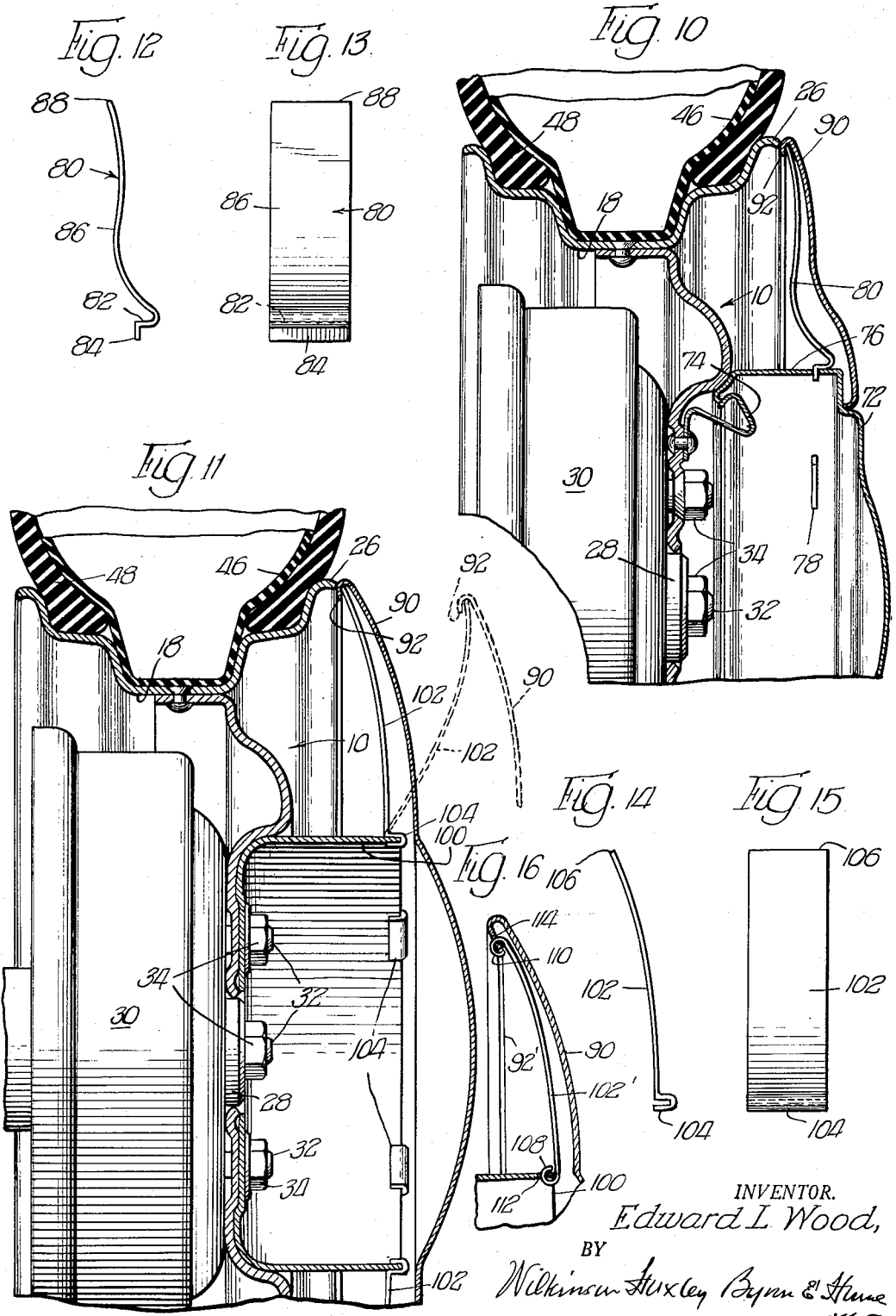

United States Patent Office 2,749,184
Patented June 5, 1956

2,749,184

WHEEL TRIM AND FASTENING MEANS

Edward L. Wood, Detroit, Mich., assignor, by direct and mesne assignments, to Gar Wood Industries, Inc., a corporation of Michigan Application March 23, 1953, Serial No. 343,852

11 Claims. (Cl. 301—37)

This invention relates to wheel trim constructions which are applied as ornamental attachments to the outer faces of automobile wheels.

It is more especially concerned with the attachment of ornamental trim rings to automobile wheels for association with the standard hub caps, or for the attachment of disks, simulated wire wheels, and similar ornamental devices, which may be associated with the ornamental ring for attachment to the wheels.

The inventions herein disclosed constitute improvements upon the wheel trim constructions shown in my prior patents, No. 2,394,958, issued February 12, 1946, and No. 2,455,151, issued November 30, 1948.

As is disclosed in my prior patents, trim rings or disks are attached to automobile wheels by means of a plurality of hinged spring links which are applied in spaced balanced relation around an automobile wheel so as to extend radially thereof. Collectively, these links exert a radial pressure upon an annular bearing on the trim member, which they hold by a spring toggle action when the trim member is forced against the bias of the springs axially of the wheel to a position where the member-engaging extremities of the spring links lie in a plane that is offset inwardly of the wheel from the plane in which their wheel-engaging extremities are hingedly fastened.

As thus applied, it was intended that the trim become more or less permanently secured to the wheels of the vehicle of application without the necessity of disturbing or removing it for access to the tire valve or for other maintenance operations until it should become necessary to remove the wheel. To give effect to this purpose, it was necessary for the valve stem to project through the trim. In the event it became necessary to remove the wheel, the trim had to be sprung outwardly against the toggle spring action of the hinged links, and, once past the dead center of the collective toggle action, the trim would be completely released and fall away. Once the spring bias on the links was released in this manner, they individually were free likewise to become disengaged from the wheel. This proved disadvantageous, due to the possibility of losing the trim, or the links, or both, and afforded difficulty in effecting the reassembly of all the parts on the wheel once they had become separated therefrom.

The present invention provides a trim ring for wheels which is applied by toggle spring clips in such a way that the valve stem remains out of sight beneath the ring, and the latter is adapted to be raised for access to the valve stem without causing the trim and the improved clips to become separated either from each other or from the wheel. A positive spring toggle action is established for securing the trim ring against the wheel when in completely installed position, while at the same time allowing the trim to be pulled outwardly in an axial direction from the wheel in spaced relation with respect thereto for access to the valve stem and underlying parts. This may be accomplished by moving one side of the trim ring outwardly, or moving the entire ring outwardly in spaced relation to the rim of the wheel. In these positions, in accordance with the improved means here disclosed, the trim ring is securely held and prevented from falling off the wheel.

The invention will become better understood by reference to the following specification when read in conjunction with the accompanying drawings, in which—

Figure 1 is a front elevational view of reduced scale of a vehicle wheel trim and hub cap assembly embodying the present invention;

Figure 2 is an enlarged sectional view taken along line 2—2 of Figure 1;

Figure 3 is a side elevational view of one of the improved spring clips made in accordance with the present invention;

Figure 4 is a front elevational view of the device shown in Figure 3;

Figure 5 is an enlarged fragmentary sectional view showing a portion of the tire rim and tire of a vehicle wheel and the relation of the spring clip of Figures 3 and 4 as applied thereto;

Figures 6, 7 and 8 are views corresponding to Figure 5, showing the attitudes of the several parts with the trim in spaced relation to the wheel, as well as closed thereupon;

Figure 9 is a mid-sectional elevational view corresponding to Figure 2, showing the trim in two attitudes of displacement relative to the wheel;

Figures 10 and 11 are enlarged fragmentary mid-sectional elevational views corresponding to Figure 9, showing modifications of the invention;

Figures 12 and 13, and Figures 14 and 15, relate, respectively, to the modifications of Figures 10 and 11; and Figure 16 is a fragmentary sectional view corresponding to Figure 11, showing a modified form of spring clip for permanently connecting a trim ring to a hub member.

Even though the inventions are not directed to vehicle wheels, per se, still, such wheels are the environment thereof, rendering it necessary for sake of completeness to offer a brief description of a typical wheel organization.

Referring now more particularly to the drawings, an automobile wheel 10 is made of pressed steel having an outwardly bowed annular portion 12 terminating in a peripheral wheel flange 14. A plurality of rivets 16 extend through the flange for securing thereto a drop center rim 18. The rim provides an annular tire chamber 20 having axially-offset tire bead seats 22 which terminate in radially-directed flanges 24. These flanges have peripheral portions formed in an annular curved lip 26, which constitute the rims proper of the wheel.

The wheel in its central portions is relieved to accommodate a wheel hub 28 which projects from the conventional brake drum 30. The wheel is secured by threaded lugs 32 which pass from the brake drum through apertures provided for that purpose in the central depression 36 of the wheel, and upon which nuts 34 are engaged. A hub cap 38 is adapted to be snapped on to cover the central depression by means of spring elements 40 secured to the wheel for this purpose. In one embodiment of the invention, the hub cap may be made integral with the wheel trim about to be described, in which case the spring elements 40 may be eliminated.

A trim ring 42 cambered in cross-section so as to present a convex surface outwardly is disposed to fill, or substantially fill, the annular space between the hub cap 38 and the peripheral lip 26 of the wheel rim. This trim ring 42 is adapted to conceal the valve stem 44 which projects from the drop center rim from an inner tube 46 carried inside of the vehicle tire 48 in the conventional manner.

A plurality of spring clips 50 made of strap spring steel, a typical one of which appears in Figures 3 and 4, is formed with a jaw end 52 and an inner hooked end 54 for securing the trim ring 42 to the wheel. As shown in these figures, the spring clip 50 has a bowed main body portion 56 which terminates at the jaw end 52 in a nose portion 58 comprised of a reverse bend and a reentrant bend 62 defining a bight 64 and a hook 66. The end of the hook 66 terminates at 68 in spaced overlying relation to the nose 58 previously described.

The curve of the hook 66 is scribed substantially from the same radius as the lip 26 of the wheel rim when regarded in right section, and is adapted to be forced thereover as appears in Figure 5, so that the nose of the jaw 58 and the hook 66 firmly grip the lip 26 of the wheel rim and project the end 68 of the hook between the bead of the tire and the rim, as appears in Figure 5. The bowed body 56 of the clip 50, the curvature of which agrees with the camber of the ring 42, causes it to be biased inwardly axially of the wheel assembly, so that collectively, as viewed in Figure 1, the radially extending spring clips are effective to urge any member engaged by their inner ends 54 inwardly axially of the wheel assembly.

The circle within which the inner hooked ends 54 of the clips 50 lie, when assembled on the rim as shown in Figures 1 and 5, is a circle of somewhat less dimension than that of the inner periphery of the trim ring 42, which is provided with an inwardly rolled edge 70, within which the hooked ends 54 of the spring clips 50 are adapted to seat. The trim ring is installed by first placing a suitable number of clips in balanced relation around the rim, five being shown in Figure 1 as a suitable number. These are applied to the periphery 26 of the rim of the wheel by being hooked thereon, so that the nose of the jaw 58 is on the inner side of the curl of the lip with the hook extending around the outer side thereof. By lightly tapping, the hook is forced upon the lip 26 which enters the bight of the hook 66, where it is pinched between the latter and the nose of the jaw 58, as appears in Figure 5. This makes a firm and positive connection between the clip and the rim, and the clip may be flexed outwardly in an axial direction against the bias of its spring body 56 without causing it to become dislodged. This is an important feature not included in my prior patents above alluded to in which the links were made separately from the clamping means for engaging the rim of the wheel and were hingedly attached to the latter. The only hinging action derived in the present construction is that realized from the flexing of the spring body of the clip, which makes collectively for a more positive toggle action in snapping the trim ring into engagement upon the wheel. In that connection, it may be noted that as the nose 58 pivots on the under side of the rim lip from the position shown in Figure 8 to the position shown in Figure 6, the extremity 68 of the hook is forcibly spread away from the nose 58 and thus tends to restore the clip to its Figure 8 position. Freedom from rattling is thus insured.

Next, the trim ring is positioned closely to the wheel, and with the fingers the clips are individually raised and given bearing within the inner roller edge 70 of the ring, wherein the hooked ends 54 find a complementary curvature.

So long as the plane within which the ends 54 of the clips lie (i. e., the plane of the inner periphery 70 of the ring) is wholly, or partly, spaced outwardly in an axial direction from the plane in which the jaws 52 of the clips engage the rim (i. e., essentially the plane of the peripheral extremity 26 of the rim), they will mutually balance one another and sustain the ring in this outwardly displaced position. When, however, the ring is forced toward the wheel past the dead center position represented by the last described plane to a point where the plane of the ends of the clips is disposed inwardly of the plane of the rim, then the bias of the springs 56, having been bowed into a lesser radial dimension to accommodate this movement, is released in an inward direction to carry the trim ring into firm engagement with the rim of the wheel, as appears in Figure 2.

It will be understood that the bowing of the spring clips 50 is always in the same direction and is at its least curvature when the trim ring is displaced in the full outward position or is seated in the completely installed position as shown in Figure 2. Various attitudes assumed by the spring in the movement of the ring from its outermost position to its innermost position are illustrated successively in Figures 6, 7 and 8.

In Figure 9 the ring 42 is cocked outwardly at the position overlying the valve stem 44 to permit access to the latter. In this instance, the resultant of the component of the spring clip diametrically opposite, which appears at the top of the drawing of Figure 9, is still such as to force the ring inwardly in its seated position. The spring clip adjacent the valve stem shown at the bottom of Figure 9 is biased outwardly past the dead center position to oppose the force of the clip just described by an equal and opposite component exerted in an outward direction. The hooked ends of the clips 54 engage the rolled edge 70 of the ring to preclude the parts from becoming separated, thus positively to maintain the assembled relationship.

If desired, the opposite side of the ring may also be moved outwardly as shown in dotted lines in Figure 9, and in any of these attitudes is securely held and is perfectly stable.

Turning now to the modification which appears in Figure 10, the hub cap assembly 72 is attached by means of spring elements 74 to the wheel in the central depression of the latter, and is provided with a cylindrical periphery 76, in which are disposed a plurality of slots 78 for receiving a spring clip 80, which is shown in side and front elevational details in Figures 12 and 13, respectively.

This clip 80 is provided with an offset base portion 82 which turns downwardly adjacent its end to provide a slot engaging tongue 84. From the base 82 the clip extends radially in a gradual reverse curvature 86 to its end 88, which is directed inwardly toward the wheel.

As shown in Figure 10, the slot engaging tongues 84 of the clips 80 are disposed in the slots 78 in the cylindrical periphery 76 of the hub cap assembly 72. A trim ring 90, in this instance having its outer peripheral edge rolled as at 92, is adapted to accommodate the outer ends 88 of the several clips 80 which are disposed in balanced spaced relation around the wheel. Here, again, the toggle action depends upon the position of the ends 88 of the clips 80 in relation to the plane of the base of the clips, or the plane in which the slots 78 occur. This latter plane determines dead center with respect to the movement of the trim ring 90, and so long as the plane of the ring at its rolled edge 92 falls inwardly in an axial direction of the wheel in relation to the plane of the slots 78, the bias of the spring clips 80 is such that by collective toggle action the ring 90 is firmly snapped into engagement with the edge 26 of the rim of the wheel.

If the ring is withdrawn past dead center of the plane of the slots 78, the trim ring is held in spaced relation to the wheel to afford access to the underlying parts, as is shown in dotted lines in Figure 11.

It should be noted that in this modification it is not necessary to provide a hooked outer end on the spring clip 80, since collectively the spring forces of these clips tend to expand radially to insure positive engagement with the rolled edge 92 of the trim ring.

The modification of Figure 11 embodies the type of spring clip shown in Figures 14 and 15 in side and front elevational views, respectively. In this embodiment, a cup member 100 is accommodated in the depression of the wheel and secured therein by apertures through which the lugs 32 project, and nuts 34 which, when screwed upon such lugs, confine the cup in position. It is within the contemplation of this modification of the invention that the cup member 100 be fastened to the wheel by bolts (not shown) which may secure the cup member thereto independently of the lugs 32 and lug nuts 34 without disturbing the attachment of the wheel to the brake drum. When this form is adopted, the cup member will be relieved at those portions of its bottom flange to clear the lugs and nuts, and threaded holes (not shown) will be provided radially outward of or between the lugs to receive the additional fastening bolts.

In this instance, the spring clips 102 are provided with an offset hooked end 104, the bight of which hook is slightly less than the thickness of the material defining the edge of the cup 100, so that they may be forced thereon and securely held in gripping relation thereto, as appears in Figure 11. The outer extremities 106 of the spring clips 102 engage the outer rolled periphery 92 of the ring member 90, as has already been described in conjunction with Figure 10. In this instance, the spring clip 102 is given a unidirectional curvature which biases it inwardly in an axial direction toward the wheel. The toggle action of the several clips as herein described is the same as that already discussed in connection with Figure 10; wherefore a more extended discussion is not deemed necessary.

To prevent unauthorized or accidental removal of the trim from the wheel, the modification of Figure 16 can be adopted. Here the spring clip 102' is formed with closed hooks 108 and 110 at each of its ends, which engage in openings 112 and 114 in the cup member 100 and trim ring 90, respectively. The outer rolled periphery 92' of the trim ring is formed to a greater extent than in the other embodiments to dispose its edge outwardly in relation to the wheel from the plane of its bearing on the latter. This will afford clearance between the closed hook 110 and the confronting portions of the wheel rim or tire, as the case may be. With the assembly completed in this manner, the trim ring and hub or cup member are effectively connected together permanently, necessitating removal of the lug nuts or other fastening means centrally of the wheel before the trim can be removed. Obviously, this form would require a centrally removable hub cap or closure plate to afford access to such fastenings.

Although the means described in the foregoing paragraph for permanently securing the trim ring and hub member together is provided with closed hooks at each of its ends for this purpose, any suitable means for effecting a hinge connection at each end of the clip with the trim ring and hub member is within the contemplation of the invention. The form of spring clip illustrated in Figures 1 to 9, inclusive, is claimed in my copending application, Serial No. 455,679, filed September 13, 1954.

I claim:

1. A wheel and wheel trim organization, an annular flange on the wheel, a trim member having a second annular flange thereon of different size than said wheel flange and coaxial therewith, a plurality of radially extending spring clips distributed in balanced relation around said wheel flange and having one end of each connected thereto, said clips being longer than the shortest distance between said flanges, each clip being bowed in compression against its own springiness into engagement with said trim flange, said clips being bowed outwardly with respect to the outer face of the wheel of application and being hidden by said trim member, said trim flange being positioned inwardly toward the wheel from the plane of the wheel flange when the trim member is in normal assembled position against the wheel, said clips having means for holding said trim member in spaced axial relation to said wheel.

2. The invention of claim 1, in which each of said clips comprises a strap of bowed spring metal, said strap having one of its ends formed into a jaw portion for clinching upon the wheel flange, the other of its ends being formed into a hook for engagement with the flange on said trim means.

3. A wheel and wheel trim organization, a hub member on the wheel, a plurality of radially extending axially-bowed springs mounted at their inner ends on said hub member, a trim ring of outwardly convex contour having its outer periphery formed into a rolled flange confronting the wheel, the radius of said flange being less than the radial extent of said springs from the center of the wheel to their outer extremities, said springs being bowed outwardly beneath said ring an amount required to seat their outer ends in said rolled flange, said springs tending to expand outwardly and being distributed angularly around said wheel in balanced relation to center said ring with respect thereto.

4. The invention of claim 3, wherein said hub flange comprises a cylindrical surface having radial slots extending therein in symmetrical relation around its periphery, each of said springs having a body portion terminating in a lateral U-shaped offset at its inner end, and a slot-engaging tongue dependent from said offset portion, said springs having their respective tongues engaged in said slots so as to radiate from said cylindrical surface with said offsets seated against said surface outwardly from the slots to resist pivotal movement of said springs about their inner ends in a direction outwardly from the wheel.

5. The invention of claim 3, in which said hub flange extends axially from the wheel in concentric relation therewith, said springs comprising each a bowed body terminating at its inner end in a lateral U-shaped offset, the bight of said U being of a size to be pressed on the edge of said flange tightly to grip the same, said springs being so applied to the edge of said flange to radiate therefrom in symmetrical balanced relation.

6. In an assembly of a wheel member and a wheel trim member positioned on one side of the wheel, a plurality of radially extending angularly spaced spring elements having one end of each connected to the wheel member, the points of connection between said elements and the wheel member lying in a circle concentric to the wheel axis and lying in a plane at right angles to the axis, said wheel trim member being connected to and supported by the opposite ends of said elements, each of said elements having a surface adjacent one end which engages a portion of one of said members and resists pivotal action of said element in a direction which would move the trim member connected end of the element away from the wheel, and said opposite end of each element being normally positioned inwardly toward the wheel from said plane, the points of connection between said elements and the trim member being located in a circle having a diameter different from that of said first mentioned circle, the distance on each of said elements between the connection points at the ends thereof when the element is unstressed being greater than the difference between the radii of said circles, the points of connection between said elements and said trim member being positioned inwardly of said plane when the trim member is held against the wheel by said elements, whereby the elements will hold and form a stable support for the trim member in either of two axially spaced positions with respect to the wheel.

7. In an assembly of a wheel and a wheel trim member positioned on one side of the wheel, a plurality of radially extending angularly spaced spring elements having one end of each connected to the wheel, the points of connection between said elements and the wheel lying in a circle concentric to the wheel axis and lying in a plane at right angles to the axis, each of said elements at its wheel-connected end having a surface which engages a portion of the wheel and resists pivotal action of said wheel-connected end in a direction which would move the opposite end of the element away from the wheel, and said opposite end being normally positioned inwardly toward the wheel from said plane, said wheel trim member having an annular channel on its inner side opening radially toward said circle and receiving the opposite ends of said elements, the diameter of the bottom of said channel being more nearly equal to the diameter of said first mentioned circle than is the circle defined by said opposite ends of the elements when said opposite ends are located in said plane and the member is not connected thereto, said channel being positioned inwardly of said plane when the member is held against the wheel by said elements, whereby the elements will hold and form a stable support for the member in either of two axially spaced positions with respect to the wheel in which the channel is on opposite sides of said plane.

8. In an assembly of a wheel and a wheel trim member positioned on one side of the wheel, a plurality of radially extending angularly spaced spring elements having one end of each connected to the wheel, the points of connection between said elements and the wheel lying in a circle concentric to the wheel axis and lying in a plane at right angles to the axis, each of said elements at its wheel-connected end having a surface which engages a portion of the wheel and resists pivotal action of said wheel-connected end in a direction which would move the opposite end of the element away from the wheel, and said opposite end being normally positioned inwardly toward the wheel from said plane, said wheel trim member having an annular channel on its inner side opening radially toward said circle and receiving the opposite ends of said elements, the diameter of the bottom of said channel being more nearly equal to the diameter of said first mentioned circle than is the circle defined by said opposite ends of the elements when said opposite ends are located in said plane and the member is not connected thereto, said channel being positioned inwardly of said plane when the member is held against the wheel by said elements, whereby the elements will hold and form a stable support for the member in either of two axially spaced positions with respect to the wheel in which the channel is on opposite sides of said plane, said opposite ends of said elements having hooks formed thereon for engaging the inner side of said channel when the member is in its outer position.

9. In an assembly of a wheel and a wheel trim member positioned on one side of the wheel, an annular flange on the wheel concentric with the wheel axis and lying in a plane at right angles to the wheel axis, a plurality of radially extending angularly spaced spring elements each having formed on one end spaced surface portions which engage opposite sides of and grip said flange to fix said one end of each element to the flange and resist pivotal action of the element in a direction which would move the opposite end of the element away from the wheel, and said opposite end being normally positioned inwardly toward the wheel from said plane, said wheel trim member being connected to and supported by said opposite ends of said elements, the points of connection between said elements and the member being located in a circle having a diameter different from that of said flange, the distance on each of said elements between the connection points at the ends thereof when the element is unstressed being greater than the difference between the radii of said circle and flange, the points of connection between said elements and said member being positioned inwardly of said plane when the member is in normal assembled position, whereby the elements will hold and form a stable support for the member in either of two axially spaced positions with respect to the wheel.

10. In an assembly of a wheel and a wheel trim member positioned on one side of the wheel, an annular flange on the wheel concentric with the wheel axis and lying in a plane at right angles to the wheel axis, a plurality of radially extending angularly spaced spring elements each having formed on one end spaced surface portions which engage opposite sides of and grip said flange to fix said one end of each element to the flange and resist pivotal action of the element in a direction which would move the opposite end of the element away from the wheel, and said opposite end being normally positioned inwardly toward the wheel from said plane, said wheel trim member having an annular channel on its inner side opening radially toward said circle and receiving the opposite ends of said elements, the diameter of the bottom of said channel being more nearly equal to the diameter of said first mentioned circle than is the circle defined by said opposite ends of the elements when said opposite ends are located in said plane and the member is not connected thereto, said channel being positioned inwardly of said plane when the member is held against the wheel by said elements, whereby the elements will hold and form a stable support for the member in either of two axially spaced positions with respect to the wheel in which the channel is on opposite sides of said plane.

11. In an assembly of a wheel and a wheel trim member positioned on one side of the wheel, an annular flange on the wheel concentric with the wheel axis and lying in a plane at right angles to the wheel axis, a plurality of radially extending angularly spaced spring elements each having formed on one end spaced surface portions which engage opposite sides of and grip said flange to fix said one end of each element to the flange and resist pivotal action of the element in a direction which would move the opposite end of the element away from the wheel, and said opposite end being normally positioned inwardly toward the wheel from said plane, said wheel trim member having an annular channel on its inner side opening radially toward said circle and receiving the opposite ends of said elements, the diameter of the bottom of said channel being more equal to the diameter of said first mentioned circle than is the circle defined by said opposite ends of the elements when said opposite ends are located in said plane and the member is not connected thereto, said channel being positioned inwardly of said plane when the member is held against the wheel by said elements, whereby the elements will hold and form a stable support for the member in either of two axially spaced positions with respect to the wheel in which the channel is on opposite sides of said plane, said opposite ends of said elements having hooks formed thereon for engaging the inner side of said channel when the member is in its outer position.

References Cited in the file of this patent

UNITED STATES PATENTS

| | | |
|---|---|---|
| 1,972,216 | Dowty | Sept. 4, 1934 |
| 2,115,098 | Engholm | Apr. 26, 1938 |
| 2,394,958 | Wood | Feb. 12, 1946 |
| 2,455,151 | Wood | Nov. 30, 1948 |
| 2,579,505 | Lyon | Dec. 25, 1951 |
| 2,644,721 | Grimshaw | July 7, 1953 |